J. B. MAYER.

Striking Mechanism for Clocks.

No. 3,536. Reissued July 6, 1869.

Wit. sses:
B. H. Muehle
Fred. W. Scott.

Inventor:
J. B. Mayer.

N. PETERS. Photo-Lithographer, Washington, D. C.

United States Patent Office.

JOHN B. MAYER, OF NIAGARA FALLS, AND TOBIAS WITMER, OF WILLIAMSVILLE, NEW YORK, ASSIGNEES OF JOHN B. MAYER.

*Letters Patent No.* 82,267, *dated September* 15, 1868; *reissue No.* 3,536, *dated July* 6, 1869.

IMPROVEMENT IN THE STRIKING-MECHANISM FOR CLOCKS.

The Schedule referred to in these Letters Patent and making part of the same.

*To all whom it may concern:*

Be it known that I, JOHN B. MAYER, of Niagara Falls, in the county of Niagara, and State New York, assignor to myself and TOBIAS WITMER, of Williamsville, Erie county, New York, have invented a new and Improved Striking-Mechanism for Clocks; and I do hereby declare that the following is a full, clear, and exact description thereof, reference being had to the accompanying drawings, making a part of this specification, in which—

Figure 2:
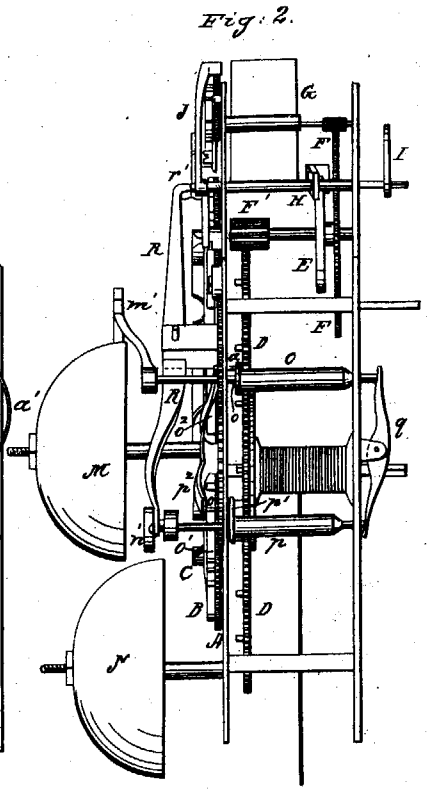
Figure 2 is an end elevation.
Figure 1:
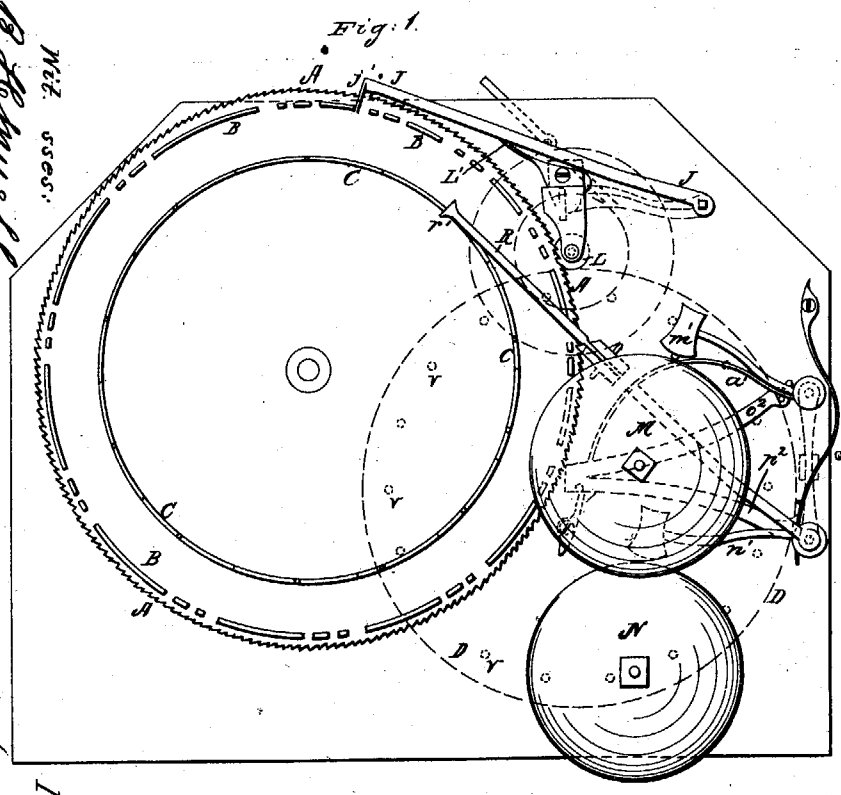
Figure 1 is a side elevation.

The nature of this invention consists in a novel construction of mechanism for clocks striking all the quarter-hour periods successively before striking the full hour.

Letters of like name and kind refer to like parts in each of the figures.

The main feature of my invention being the combination of the locking-mechanism for both hour and quarter-hammers, with a locking-wheel of one hundred and ninety-eight teeth.

I will proceed to describe these parts first.

One casting, as shown in the drawing, admirably answers the purpose of this combination, though either part may be cast separately, and attached to one common shaft, if preferred.

A represents the wheel which carries locking-mechanism, and which has one hundred and ninety-eight (198) teeth, or any fraction or multiple of that number; this number being found by adding the strokes of the quarter-bell required in twelve hours to those of the hour-bell in the same time, as follows:

1, 2, 3, and 4 make 10, multiplied by 12, is 120, the number of quarter-stroks in twelve hours. Then add 1, 2, 3, &c., to 12, and to the result, 78, (the number of strokes of the hour-bell,) add 120, which gives 198.

This wheel A is mounted upon the end of a projecting shaft, and revolves once every twelve hours.

B represents the locking-mechanism of the quarter-bell, and C that of the hour-bell.

The locking-mechanism for the hour-bell consists of a plate, disk, or wheel, having alternate projections and notches or depressions, the length of the former being in proportion to the number of strokes for the twelve consecutive hours. The projections of the locking-mechanism of the quarter-bell are made to correspond with the quarter, half, three-quarter, and four-quarter strokes of the bell, with this distinction, that the four-quarter projection is extended, so as to keep the train in motion, while the hour-bell, actuated by the hour locking-mechanism, gives the required number of strokes.

The train of wheels employed to set my improved striking-apparatus in motion consists of two wheels, two pinions, and a fly.

The main driving-wheel D, to which the barrel and weighted cord are attached, in a common manner, is also used as the pin wheel.

It is provided with eighteen pins, and has one hundred and eighty teeth, which gear with a pinion, F′, of ten teeth, upon the shaft.

This second shaft carries the tumbler-wheel E, and a spur-wheel F, which gear with the pinion upon the fly G.

The tumbler-wheel E is of ordinary construction, as is also the lifting-piece H, the shaft of which carries the lever I, connecting with the going-part of the clock in a common manner, and the lever J, which acts upon the locking-mechanism B, having a key formed at its end, at right angles thereto, as shown at J′.

The shaft of the wheel F carries upon its projecting end the gathering-pallet L, which is in line with the wheel A, and, at every revolution of the wheel F and pinion F′, engages with the ratchet-teeth of the wheel, and moves the same one tooth forward, and, because the pinion F′ has one-eighteenth the number of cogs of the main-wheel D, and the latter carries eighteen pins, one revolution of the gathering-pallet will produce one stroke of the bell.

A spring-pawl, L′, one end of which is secured to the side of the frame, and the other engages with the teeth of the wheel A, serves to hold the latter until the gathering-pallet again moves it along one tooth further.

M represents the quarter-bell, and N the hour-bell; *m* and *n* are the respective hammers; O and P the rocking-shafts upon which they are supported; and $o^1$ $p^1$ the hammer-tails, which are oscillated by coming in contact with the pins of the pin-wheel D, and thereby strike the bell.

All these parts are constructed and operated in a common and well-known manner, and, in connection with the parts herein above described, the quarters and hours would be struck upon both bells simultaneously, but for the following contrivance:

The shaft O and P, which extend horizontally and parallel from one frame-plate to the other, are made movable lengthwise in their bearings, in such manner that the hammer-tails $o^1$ and $p^1$ may be presented to the action of the pins of the pin-wheel alternately; while one is located in line with the pins, the other is removed to one side, and out of their reach.

A two-armed lever, *q*, connects the ends of the shafts, for the purpose of rendering their movement back and forth precise and simultaneous. The opposite and front ends of the shafts carry the hammers, as shown in the drawings.

The springs $o^2$ and $p^2$, the ends of which press upon pins projecting from the hammer-tails, through slots in the frame-plate, are so regulated and adjusted that the hammer-tail of the hour-bell will always be in line with the pins of the pin-wheel, and, when temporarily removed sidewise, will always return to its normal position.

R represents a lever, having its fulcrum at or near its centre. One end of this lever has a tooth, which engages with the notches and projections of the hour-locking mechanism, as shown at $r'$, and the other end bears upon the projecting end of the shaft P, which carries the hammer of the hour-bell, in such manner that, when the tooth $r'$ rests in a notch of the locking mechanism C, the hammer-tail of the quarter-bell is within reach of the pins of the pin-wheel, and when the tooth $r'$ mounts one of the projections, the hammer-tail of the hour-bell will be operated by the pin-wheel.

The operation of my improved striking mechanism for clocks may be easily understood after a careful examination of the drawings.

The lever J alone regulates the starting and stopping of the running-gear, and the notches and projections of the locking-mechanism B are so arranged upon its periphery that the quarters and hours both would be given correctly upon one bell, M, were it not for the lever R, which, impelled by the projections of the locking-mechanism C, transfers the action of the pin-wheel from the quarter-hammer to the hour-hammer at the proper time, viz, at the very instant when the quarter-bell has sounded the four quarters.

Then the tooth $r'$ mounts a projection of the locking-mechanism C, the change of hammer-tails takes place, and the hour-bell begins its performance, while the train of wheels moves steadily on until the requisite number of hour-strokes is given, when the lever J drops into a notch, and the train stops.

What I claim as my invention, and desire to secure by Letters Patent, is—

1. The sliding-shafts O and P, carrying the hammer-tails, and the operating-lever $q$, combined and operating substantially as described.

2. The shifting-lever R, in combination with the locking-mechanism C, and sliding hammer-shaft P, for alternating the action of the hammers on the bells, substantially as set forth.

3. The combination of the locking-mechanism B C, and the locking-wheel A, for controlling the action of the hour and quarter-hour hammers on two or more separate bells, substantially as set forth.

4. The wheel D, pinion F', tumbler-wheel E, spur-wheel F, the pinion and fly-wheel G, in combination with the hammer-tails, in order to effect the striking of quarters and hours on separate bells, substantially as set forth.

To the above I have signed my name, this 13th day of March, 1869.

JOHN B. MAYER.

Witnesses:
H. N. GRIFFITH,
SAMUEL TOMPKINS.